(12) United States Patent
Olgaard et al.

(10) Patent No.: US 6,757,261 B1
(45) Date of Patent: Jun. 29, 2004

(54) GSM TRANSCEIVER WITH TIME DIVISION DUPLEXED OPERATIONS FOR RECEIVING DATA, MONITORING SIGNAL STRENGTH AND TRANSMITTING DATA DURING A SINGLE TIME FRAME

(75) Inventors: Christian Volf Olgaard, Sunnyvale, CA (US); Steve Yeung, Fremont, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 756 days.

(21) Appl. No.: 09/643,275

(22) Filed: Aug. 22, 2000

(51) Int. Cl.[7] .............................. H04J 3/00; H04J 3/06; H04Q 7/20

(52) U.S. Cl. ....................... 370/280; 370/345; 370/336; 370/509; 455/450

(58) Field of Search ................................ 370/347, 314, 370/276, 277, 278, 280, 282, 458, 294, 329, 336, 337, 442, 468, 470, 473, 281, 345, 350, 509, 510, 478; 455/450, 70, 68, 69, 118

(56) References Cited

U.S. PATENT DOCUMENTS

| | | | |
|---|---|---|---|
| 6,240,076 B1 * | 5/2001 | Kanerva et al. | 370/330 |
| 6,366,566 B1 * | 4/2002 | Scott | 370/280 |
| 6,532,226 B1 * | 3/2003 | Lehtinen et al. | 370/347 |
| 6,587,444 B1 * | 7/2003 | Lenzo et al. | 370/330 |

* cited by examiner

Primary Examiner—Hanh Nguyen
(74) Attorney, Agent, or Firm—Vedder, Price, Kaufman & Kammholz, P.C.

(57) ABSTRACT

A Global System for Mobile (GSM) cellular system transceiver with time division duplexed operations for receiving a data signal, monitoring received signal strength and transmitting a data signal during a single time frame. Multiple data registers are used to store the phase lock loop (PLL) frequency control data, e.g., during the last time slot (slot 7) of the prior time frame (or elsewhere in the prior time frame where time permits). Also during slot 7 of the prior time frame, the PLL is programmed using the first data set for the data reception operation to be performed during one or more of the initial time slots (e.g., time slots 0–3) of the present time frame. During the next time slot (e.g., slot 4), the PLL is programmed using the second data set for the signal strength monitoring operation to be performed during that same time slot. During the next time slot (e.g., slot 5), the PLL is programmed using the third data set for the data transmission operation to be performed beginning in that same time slot. By prestoring all three PLL frequency control data sets, such data sets are immediately available when later programming the PLL, thereby reducing the PLL setup time needed prior to each use. Consequently, an integer PLL can be used instead of a fractional PLL while still achieving a sufficiently fast combined setup and lock time, thereby minimizing integrated circuit area and power requirements.

33 Claims, 5 Drawing Sheets

FIG. 3 (PRIOR ART)

| | MSB | | | | | | | | | | | | | | | | | | | | | LSB | |
|---|---|---|---|---|---|---|---|---|---|---|---|---|---|---|---|---|---|---|---|---|---|---|---|
| | 23 | 22 | 21 | 20 | 19 | 18 | 17 | 16 | 15 | 14 | 13 | 12 | 11 | 10 | 9 | 8 | 7 | 6 | 5 | 4 | 3 | 2:0 | |
| 201 — Power Control | | | | | | | | | | | | | | | | | Ldo Tx | IF syn | RF syn | Rx | 000 |
| 202 — Gain Control | Out 4 | Out 3 | Out 2 | Out 1 | Auto cal | Lna bias | | | Lna on | Res | Lna 2 | Lna 1 | Res | Coarse VGA gain (6 dB step) | | Fine VGA gain (1 dB step) | | | IF amp | Xtal en | 001 |
| 203 — N-Counter RF PLL | Rx/Tx | GSM mo | | | | N-count value | | | | | | | | | | | | | | | | Reserved | 010 |
| 204 — N-Counter IF PLL | | | Reserved | | | | | Out 1 mode | | | | | | IF N-count value | | | | | | | | 011 |
| 205 — R-Counter PLLs | GSM TX | IF lpo | IF PD | IF Rst | | Out 3 mode | | sync refs | RF PD | RF Rst | | RF R-count value | | | | | | Reserved | | | | 100 |
| 206 — Wide band PLL | | | Out 4 mode | | | | Xtal tuning | | | Filt adj | Res. | Vcp start | | IQ swp | | PD | R-count value | | | N-count value | | 101 |
| 207 — Misc. control | | | RX CM | | | | | | | Act. LDO | Res | Activate PLLs | | Activate TX blocks | | lpo | res | Act. Xtal Ldo | Activate RX blocks | Res | 110 |

200

| | MSB | | | | | | | | | | | | | | | | | | | LSB | |
|---|---|---|---|---|---|---|---|---|---|---|---|---|---|---|---|---|---|---|---|---|---|
| | 23 | 22 | 21 | 20 | 19 | 18 | 17 | 16 | 15 | 14 | 13 | 12 | 11 | 10 | 9 | 8 | 7 | 6 | 5 | 4 | 3:0 |
| 01a — Power Control 1 | | | | | | | | | | | | | | | | | Tx | IF syn | RF syn | Rx | 0000 |
| 01b — Power Control 2 | | | | | | | | | | | | | | | | | Tx | IF syn | RF syn | Rx | 0001 |
| 01c — Power Control 3 | | | | | | | | | | | | | | | | | Tx | IF syn | RF syn | Rx | 0010 |
| 02a — Gain Control | | | | | | | | | Out 4 | Out 3 | Out 2 | Out 1 | Auto cal | Coarse VGA gain (6 dB step) | Coarse VGA gain (6 dB step) | | Fine VGA gain (1 dB step) | Fine VGA gain (1 dB step) | | IF amp | 0011 |
| 02b — Gain Control | | | | | | | | | Out 4 | Out 3 | Out 2 | Out 1 | Auto cal | Coarse VGA gain (6 dB step) | Coarse VGA gain (6 dB step) | | Fine VGA gain (1 dB step) | Fine VGA gain (1 dB step) | | IF amp | 0100 |
| 02c — Gain Control | | | | | | | | | Out 4 | Out 3 | Out 2 | Out 1 | Auto cal | Coarse VGA gain (6 dB step) | Coarse VGA gain (6 dB step) | | Fine VGA gain (1 dB step) | Fine VGA gain (1 dB step) | | | 0101 |
| 03a — N-Counter RF PLL 1 | Lna on | Lna 3 | Lna 2 | Lna 1 | Rx/Tx | GSM mo | | N-count value | | | | | | | | | | | | | 0110 |
| 03b — N-Counter RF PLL 2 | Lna on | Lna 3 | Lna 2 | Lna 1 | Rx/Tx | GSM mo | | N-count value | | | | | | | | | | | | | 0111 |
| 03c — N-Counter RF PLL 3 | Lna on | Lna 3 | Lna 2 | Lna 1 | Rx/Tx | GSM mo | | N-count value | | | | | | | | | | | | | 1000 |

FIG. 4A

| FIG. 4A |
| FIG. 4B |

FIG. 4

| | | | | | | | | |
|---|---|---|---|---|---|---|---|---|
| 304a | N-Counter IF PLL 1 | | | | IF N-count value | | | 1001 |
| 304b | N-Counter IF PLL 2 | | | | IF N-count value | | | 1010 |
| 305 | R-Counter PLLs | Out 1 mode | Out 2 mode | IF PD | IF Ipo | IF R-count | RF PD | RF R-count value | 1011 |
| 306 | Wide band PLL | Out 3 mode | Out 4 mode | Filt adj | GSM TX | Vcp start | Ipo | Lna bias | 1100 |
| 307 | Misc. control | Xtal tuning | RX CM | IQ swp | Act. LDO | Activate PLLs | Activate TX blocks | Activate Vco | Act. Xtal en | Xtal Ldo | R-count value | Act. Activate RX blocks | N-count value | 1101 |
| | | | | res | | | | | 1110 |
| 308 | Test Mode | DAC select | DAC value | | pll test | RF mix | tx phase shift | | 1111 |

GSM TRANSCEIVER WITH TIME DIVISION DUPLEXED OPERATIONS FOR RECEIVING DATA, MONITORING SIGNAL STRENGTH AND TRANSMITTING DATA DURING A SINGLE TIME FRAME

BACKGROUND OF THE INVENTION

1. Field of the Invention

The present invention relates to time division multiple access (TDMA) communication systems, such as Global System for Mobile (GSM) transceivers, and in particular, to GSM transceivers capable of receiving General Package Radio Service (GPRS) data.

2. Description of the Related Art

As is well known, GSM is a second-generation cellular communication system standard that was developed to solve problems associated with the original analog cellular communication systems in Europe. GSM uses digital communication techniques, including frequency division duplexing (FDD) and a combination of time division multiple access (TDMA) and frequency division multiple access (FDMA) techniques to allow simultaneous access by base stations to multiple users.

Referring to FIG. 1, each communication channel in a GSM system is accessed on a time shared basis and is divided into time frames, which are 4.615 milliseconds long. Each time frame is divided into eight time slots 0–7, each of which is approximately 577 microseconds long. During normal used, i.e., during voice transmission and reception, the digitized voice information is packetized and transmitted during different time slots. For example, a receive operation for accepting incoming voice data may take place during time slot 0, while a transmit operation for sending voice data may take place during time slot 3. Additionally, a monitor function may be performed, e.g., during time slot 6, during which the signal strength for signals arriving from different base stations is monitored for power level. It is necessary to separate these active time slots 0, 3, 6 by two or more unused time slots so as to allow the common, or shared, phase lock loop (PLL) within the GSM handset to be set up and locked at the correct frequency for the receive, transmit or monitoring function. Minimum set up and lock times are required due to the use of integer PLL circuits. These integer PLL circuits are generally preferred over fractional PLL circuits since they are less complex and hence require significantly less integrated circuit area and less DC power.

Referring to FIG. 2, the transmit and receive functions of a GSM handset can be implemented using conventional transmitter and receiver circuit architectures. In this example, such functions can be implemented in an integrated form using a circuit 100 such as the LMX3411 manufactured by National Semiconductor Corporation of Santa Clara, Calif. As discussed in more detail below, this transmitter uses a modulation synthesizer architecture to convert an I/Q baseband representation to the desired transmit frequency. The receiver is a dual conversion receiver with channel selectivity provided by a SAW filter at the intermediate frequency (IF). In this particular integrated circuit 100, most of the transmitter and receiver functions are integrated within the chip.

Incoming signals received by the antenna 102 are forwarded to the low noise amplifier (LNA) stage 104, the bias for which is controlled by a control circuit within the chip 100. A band pass filter stage 106 filters the amplified signal prior to its frequency down conversion in the RF mixer stage 108 which is driven by a local oscillator signal provided by the RF PLL circuit 110 which uses an integer PLL 112. The resulting IF signal is filtered by an external SAW band pass filter 112 which provides the channel selectivity. The filtered IF signal is then amplified by an IF amplifier 114 having a programmable signal gain.

The amplified IF signal is converted to a quadrature representation in an I/Q mixer stage 116. The local oscillator signal is provided by the IF PLL circuit 114 which also uses an integer PLL 116. The resulting I and Q signals are low pass filtered and further amplified in a digitally programmable gain amplifier stage 118.

The transmitter architecture is based on a closed loop modulation of wide band frequency synthesizer. A wide band PLL 122 modulates an external voltage control oscillator (VCO) 126 having a loop filter bandwidth, as determined by the loop filter 124, sufficiently wide to correctly track the modulation inserted into the loop. A low pass filter 128 is used to filter out harmonics of the output signal prior to its amplification by the power amplifier 130 and transmission via the antenna 102. The output signal is also fed back to the transmitter down conversion mixer 118, which also receives its local oscillator signal from the RF PLL circuit 110. The resulting IF signal is band pass filtered and converted to a quadrature representation in the transmit quadrature mixer stage 120 in accordance with the outgoing signal data intended for transmission. These I and Q signals are low pass filtered and provided to the wide band PLL 122, along with the shared signal from the IF PLL circuit 114.

As discussed in more detail below, the aforementioned control and programming functionality is achieved by a way of an interface and control stage 120 which provides the programmable control data for the various control stages and programmable circuits.

Referring to FIG. 3, the interface and control stage 120 includes a set 200 of seven registers 201–207, which are used to store strings of control data ranging from 8 to 24 bits in length. The first register 201 controls power to the various stages of the circuit 100. The second register 202 provides the gain control information for the various programmable gain stages. The third 203 and fourth 204 registers store the control data for the N-counters within the RF 112 and IF 116 PLL stages (FIG. 2). The fifth register 205 stores the control data for the R-counters within the PLL stages 112, 116. The sixth register 206 stores the control data for the wide band PLL stage 122. The last register 207 stores miscellaneous control data used for various other functions within the circuit 100.

While the above-discussed transceiver architecture and control works well for most GSM services, particularly voice transmission and reception, the introduction of data services, such as GPRS, presents a problem concerning the lock time requirement of the PLL circuits. For example, for Class 12 GPRS, the worst case PLL lock time requirement is approximately 200 microseconds when using the above-discussed conventional approach for programming the receiver. In order to achieve this 200 microsecond lock time, the PLL circuits would need to be fractional PLL circuits which require significantly more integrated circuit area and DC power than integer PLL circuits such as those presently used in most cases. This means, that for normal voice operation where this faster lock time is not required, the power consumption of the handset is nonetheless increased significantly.

More specifically, a Class 12 GPRS operation will use up to five of the available eight time slots in a GSM time frame for data communication. For example, four receive slots and one transmit slot may be used, resulting in the following analysis (it will be understood that other permutations of receive and transmit slots may also be used and will yield the same analysis). As is known, a GSM time frame has eight time slots, each of which is approximately 577 microseconds. In this example, four receive operations, one transmit operation and one power monitor operation must be completed within the one time frame. Additionally, the transceiver needs to be set up for the subsequent time frame. Technically, there are two time slots allowed between the end of the receive operation and the beginning of the transmit operation within the time frame. However, since a GSM system is synchronized to the base station, the transmit signal may need to be transmitted prior to the actual start of the time slots within the intended handset so as to ensure that the signal arrives at the base station as the correct time. This is called "timing advance." The maximum specified timing advance is approximately 232 microseconds, or 63 bits, so the time interval between when the receive operation is completed and the transmit operation is begun may be reduced by up to 232 microseconds.

Additionally, when the handset needs to monitor different base stations for power level (often referred to as a received signal strength indicator, or RSSI, function), this is normally done between the receive and transmit operations (provided that there are at least two time slots between the receive and transmit time slots). The typical time duration of the monitor operation is approximately 232 microseconds, or the time equivalent of 64 bits. Accordingly, in order to achieve this, the transceiver must be programmed twice and the RF synthesizers must be locked twice within the remaining time.

The timing analysis is as follows. Two time slots total approximately 1,154 microseconds. Subtracted from this total time are the maximum timing advance of 232 microseconds and the duration of the monitor operation of 236microseconds. Further subtracted from this total time are two 8-bit write operations (for programming the power control registers in order to turn the receive and transmit sections on and off) totaling 16 microseconds (assuming a net programming speed of 1 bit per microsecond to include microprocessor calculation and setup). This leaves a net available time of 666 microseconds for setting up and locking the RF PLL stage two times, or 333 microseconds per PLL programming operation. With a net programming speed of 1 bit per microsecond and approximately 100 bits required to be written for each operation, this leaves a maximum time of 233 microseconds available for achieving phase lock. For the conventional integer PLL circuits used, this is not enough time for achieving phase lock.

Indeed, this time may be even less where a separate monitor, or RSSI, section must be cycled. In other words, there may be four 8-bit write operations required: (1) power down the receive section; (2) power up the monitor section; (3) power down the monitor section; and (4) power up the transmit section.

Accordingly, it would be desirable to have an improved technique for accommodating Class 12 GPRS operations within a GSM handset without requiring the increased cost and power requirements associated with the need for using fractional PLL circuits to met the faster phase lock time requirements.

SUMMARY OF THE INVENTION

A GSM receiver with time division duplexed operations for receiving a data signal, monitoring received signal strength and transmitting a data signal during a single time frame in accordance with one embodiment of the present invention uses a PLL control stage having multiple registers for storing control data that is preprogrammed prior to initiation of the receive, monitoring and transmit operations. These registers are preprogrammed with the control data during a time slot (e.g., time slot 7) within the prior time frame. This allows the programming for setting up the RF PLL to be reduced to the 16 bits (8 bits for power down plus 8 bits for power up) for the power control registers, thereby leaving more than 300 microseconds available for achieving phase lock and, in turn, thereby allowing standard integer PLL circuits to be used within the transceiver.

An apparatus including a GSM transceiver with time division duplexed operations for receiving a data signal and transmitting a data signal during a single time frame in accordance with one embodiment of the present invention includes a receiver stage, a transmitter stage, a signal generator stage and a controller stage. The receiver stage is configured to receive a local signal and in accordance therewith receive and frequency convert an incoming data signal during a first portion of a plurality of time slots within a present time frame and in accordance therewith provide a frequency converted incoming data signal. The transmitter stage is configured to receive the local signal and in accordance therewith receive and frequency convert an outgoing data signal during a second portion of the plurality of time slots within the present time frame and in accordance therewith provide a frequency converted outgoing data signal. The signal generator stage, coupled to the receiver and transmitter stages, is configured to receive first and second sets of control data and in accordance therewith provide the local signal at first and second signal frequencies during the first and second portions, respectively, of the plurality of time slots within the present time frame. The controller stage, coupled to the signal generator stage, is configured to receive and store the first and second sets of control data during a prior time frame and to provide to the signal generator stage one of the first and second sets of control data during a time interval between the first and second portions of the plurality of time slots within the present time frame.

A method for time division duplexing operations within a GSM transceiver for receiving a data signal and transmitting a data signal during a single time frame in accordance with another embodiment of the present invention includes the steps of:

storing first and second sets of frequency control data during a prior time frame;

reading the first set of frequency control data during a first time interval and in accordance therewith generating a local signal at a first frequency;

receiving and frequency converting an incoming data signal in accordance with the local signal at the first frequency during a first portion of a plurality of time slots within a present time frame and in accordance therewith generating a frequency converted incoming data signal;

reading the second set of frequency control data during a second time interval and in accordance therewith generating the local signal at a second frequency; and receiving and frequency converting an outgoing data signal in accordance with the local signal at the second frequency during a second portion of the plurality of time slots within the present time frame and in accordance therewith generating a frequency converted outgoing data signal;

wherein one of the first and second time intervals is between the first and second portions of the plurality of time slots within the present time frame.

BRIEF DESCRIPTION OF THE DRAWINGS

FIG. 3 is a diagram depicting the control data registers used in the interface and control block of the circuit of FIG. 2.

FIG. 4 is a diagram depicting the multiple control data registers used in a GSM transceiver in accordance with one embodiment of the present invention.

DETAILED DESCRIPTION OF THE INVENTION

Figure 1:
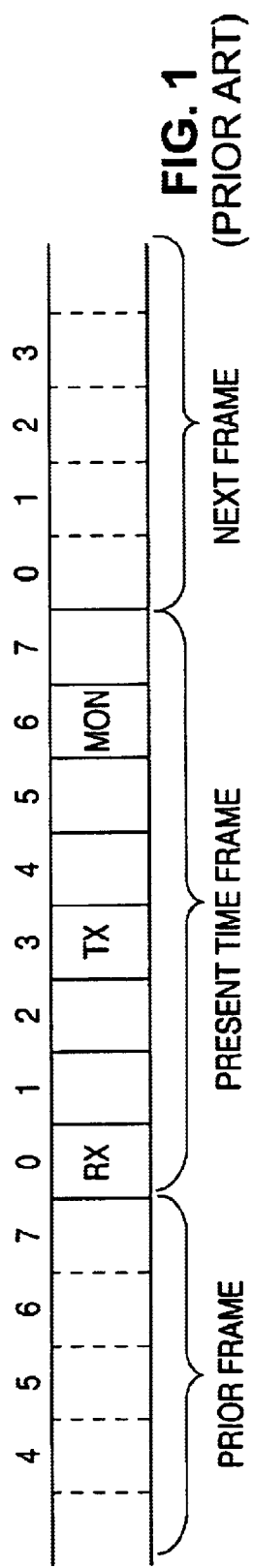
FIG. 1 is a timing diagram depicting the time slots within a GSM time frame.

Referring to FIG. 4, the set 300 of registers for a GSM transceiver in accordance with the present invention includes three registers 301a, 301b, 301c for power control, three registers 302a, 302b, 302c for gain control, three registers 303a, 303b, 303c for the N-counter data for the RF PLL, and two registers 304a, 304b for the N-counter data for the IF PLL. By programming power control register 301a, the values stored in gain control register 302a, RF PLL N-counter register 303a and IF PLL N-counter register 304a are activated. Similarly for power control register 301b and power control register 301c. (The IF PLL only requires two registers 304a, 304b since it uses one fixed frequency for transmission and another fixed frequency for reception.) Therefore, only a single write operation involving eight bits to the power control register will be required to select an operation like enabling the RF PLL. Accordingly, a simple timing analysis demonstrates that phase lock by the RF PLL can begin immediately after completion of the receive operation.

Further in accordance with the presently claimed invention, three additional registers (not shown) may be included where an additional monitor, or RSSI, operation is desired (e.g., receive—monitor—transmit—monitor): one more register 301d for power control; one more register 302d for gain control; and one more register 303d for N-counter data for the RF PLL.

Still further in accordance with the presently claimed invention, one common power control register 301 can be used, rather than three or more separate registers 301a, 301b, 301c, 301d, with indexing used to identify the appropriate gain control register 302 and counter registers 303, 304 to be used during any specific time interval. For example, within an indexing section of the common power control register 301 the bit pattern "00" could be used to designate the use of gain control register 302a and N-counter register 303a, the bit pattern "01" could be used to designate the use of gain control register 302b and N-counter register 303b, and so on.

Figure 5:
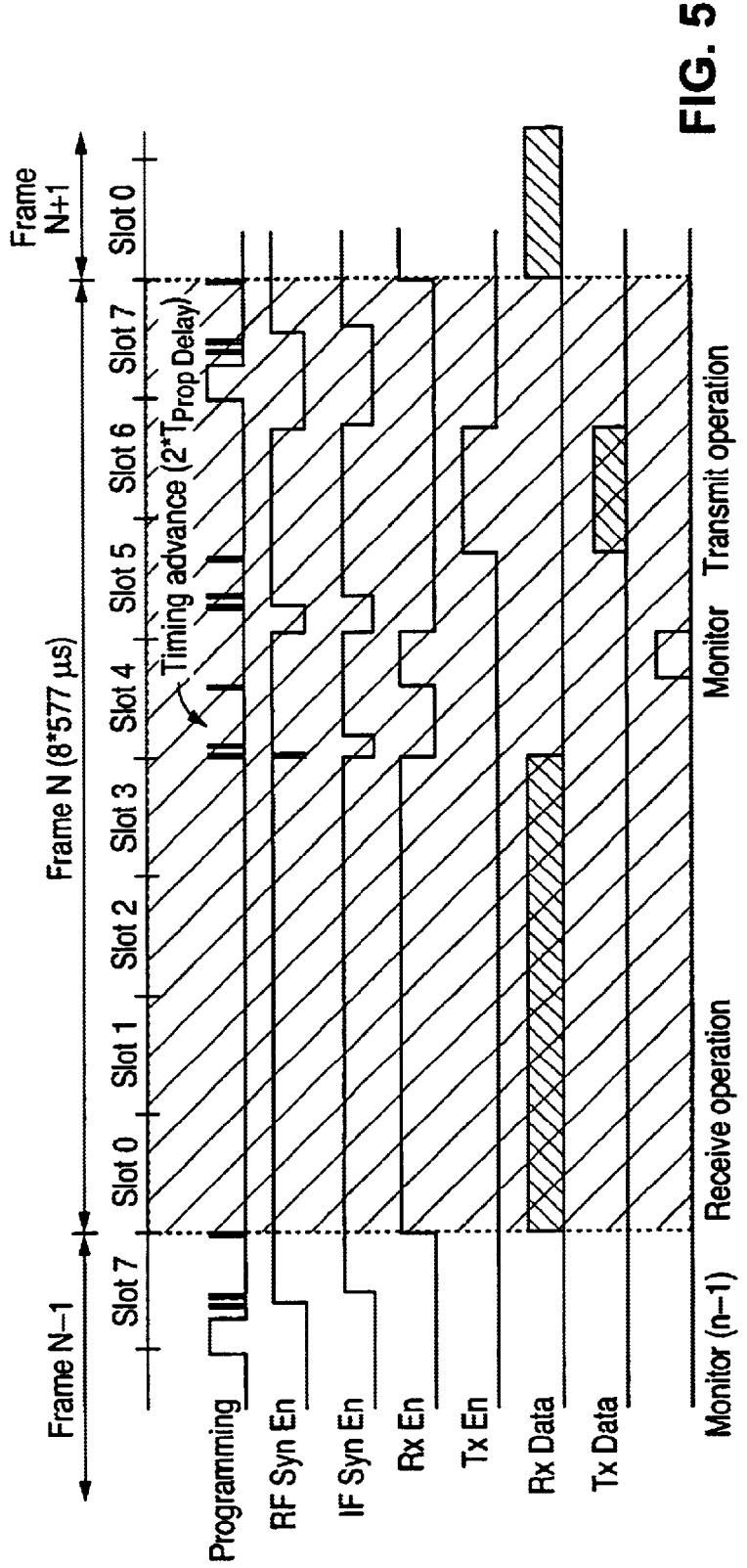
FIG. 5 is a timing diagram for the time division duplexed operations for receiving a data signal, monitoring received signal strength and transmitting a data signal within a single GSM time frame in accordance with one embodiment of the present invention.
Figure 2:
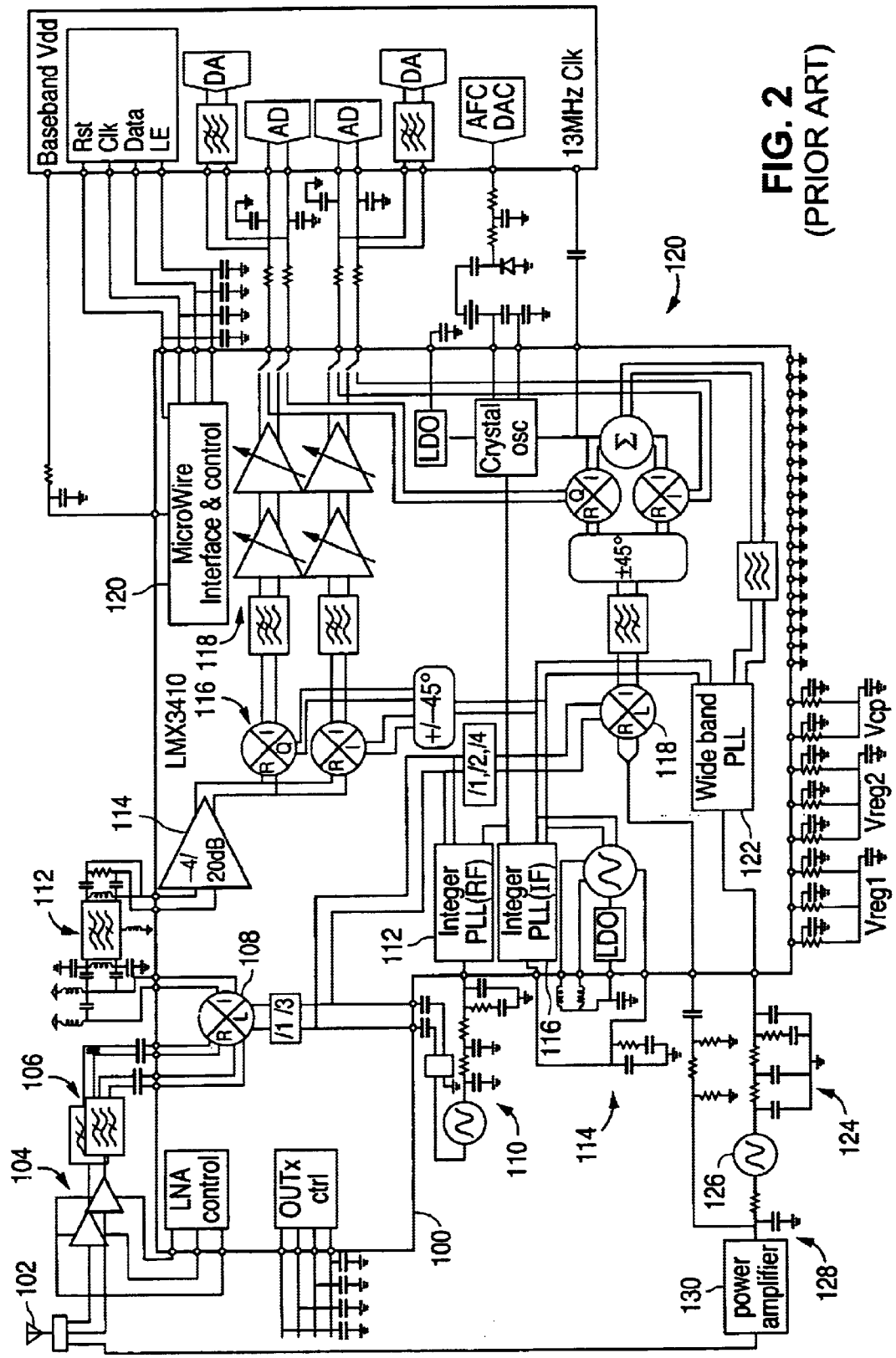
FIG. 2 is a functional block diagram of a conventional GSM transceiver architecture.

Referring to FIG. 5, the timing for the above-discussed reading and writing of the data registers 300 (FIG. 4), as well as the enablement and disablement of the RF and IF synthesizers and receive and transmit operations are as shown. Initial programming of the transceiver control data registers 300 is done during the prior time frame, e.g., during the last time slot. During this time interval, the three gain control registers 302a, 302b, 302c and the three PLL registers 303a, 303b, 303c need to be programmed. (The IF PLL registers are only written once due to the use of fixed frequencies in the transmit and receive operations.)

The timing analysis for programming during the prior time frame is as follows. The total time available in the time slot is 577 microseconds. From this is subtracted 8 microseconds for an 8-bit programming operation to turn off all transceiver stages. Further subtracted is 120 microseconds for programming five registers of 24 bits each (2 gain registers and 3 PLL N-counter registers). Still further subtracted is 8 microseconds for an 8-bit programming operation for initiating the phase lock operation for the present time frame. This leaves 441 microseconds of time remaining for setting up and locking the RF PLL. With 300 microseconds required for achieving phase lock, the setup time available is 141 microseconds, which is more than sufficient for setting up the programming of the registers (since the actual programming time has already been subtracted out as part of the aforementioned 120 microsecond register setup time).

The foregoing discussion has used, as an example, an operations sequence whereby data is received, received signal strength is monitored and data is transmitted, in that order. However, it will be understood that signal strength monitoring need not necessarily be done, in which case fewer control data registers are needed, and the data reception, transmission and signal strength monitoring can be performed in any order or as many times as desired. What is important is that an appropriate number of control data registers are used to provide for preprogramming of the necessary control data during a time slot in the prior frame, thereby providing immediate access for all control data during the present time frame on an as-needed basis.

Various other modifications and alterations in the structure and method of operation of this invention will be apparent to those skilled in the art without departing from the scope and spirit of the invention. Although the invention has been described in connection with specific, preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a GSM transceiver with time division duplexed operations for receiving a data signal and transmitting a data signal during a single time frame, comprising:

a receiver stage configured to receive a local signal and in accordance therewith receive and frequency convert an incoming data signal during a first portion of a plurality of time slots within a present time frame and in accordance therewith provide a frequency converted incoming data signal;

a transmitter stage configured to receive said local signal and in accordance therewith receive and frequency convert an outgoing data signal during a second portion of said plurality of time slots within said present time frame and in accordance therewith provide a frequency converted outgoing data signal;

a signal generator stage, coupled to said receiver and transmitter stages, configured to receive first and second sets of control data and in accordance therewith provide said local signal at first and second signal frequencies during said first and second portions, respectively, of said plurality of time slots within said present time frame; and a controller stage, coupled to said signal generator stage, configured to receive and store said first and second sets of control data during a prior time frame and to provide to said signal generator stage one of said first and second sets of control data during a first time interval between said first and second portions of said plurality of time slots within said present time frame.

2. The apparatus of claim 1, wherein said receiver stage comprises:

a frequency conversion stage configured to frequency convert said incoming data signal and in accordance therewith provide said frequency converted incoming data signal; and a quadrature mixer stage, coupled to said frequency conversion stage, configured to receive and convert said frequency converted incoming data signal to a quadrature baseband data signal.

3. The apparatus of claim 1, wherein said transmitter stage comprises:

a quadrature mixer stage configured to receive and convert said outgoing data signal to a quadrature data signal; and a frequency conversion stage, coupled to said quadrature mixer stage, configured to receive said local signal and in accordance therewith receive and frequency convert said quadrature data signal and in accordance therewith provide said frequency converted outgoing data signal.

4. The apparatus of claim 1, wherein said signal generator stage comprises an integer phase lock loop circuit.

5. The apparatus of claim 4, wherein said controller stage comprises:

a first data register configured to store said first set of control data; and a second data register configured to store said second set of control data.

6. The apparatus of claim 4, wherein said first time interval has a duration which is less than one of said plurality of time slots within said present time frame.

7. The apparatus of claim 1, wherein said controller stage comprises:

a first data register configured to store said first set of control data; and a second data register configured to store said second set of control data.

8. The apparatus of claim 1, wherein said first time interval has a duration which is less than one of said plurality of time slots within said present time frame.

9. The apparatus of claim 1, wherein:

said receiver stage is further configured to monitor another incoming signal during a third portion of said plurality of time slots within said present time frame and in accordance therewith provide an indication of a signal strength of said another incoming signal;

said signal generator stage is further configured to receive a third set of control data and in accordance therewith provide said local signal at a third signal frequency during said third portion of said plurality of time slots within said present time frame; and said controller stage is further configured to receive and store said third set of control data during said prior time frame and to provide to said signal generator stage another of said first, second and third sets of control data during a second time interval between said first and third portions of said plurality of time slots within said present time frame.

10. The apparatus of claim 9, wherein said controller stage comprises:

a first data register configured to store said first set of control data;

a second data register configured to store said second set of control data; and a third data register configured to store said third set of control data.

11. The apparatus of claim 9, wherein each of said first and second time intervals has a duration which is less than one of said plurality of time slots within said present time frame.

12. An apparatus including a GSM transceiver with time division duplexed operations for receiving a data signal and transmitting a data signal during a single time frame, comprising:

receiver means for receiving a local signal and in accordance therewith receiving and frequency converting an incoming data signal during a first portion of a plurality of time slots within a present time frame and in accordance therewith providing a frequency converted incoming data signal;

transmitter means for receiving said local signal and in accordance therewith receiving and frequency converting an outgoing data signal during a second portion of said plurality of time slots within said present time frame and in accordance therewith providing a frequency converted outgoing data signal;

signal generator means for receiving first and second sets of control data and in accordance therewith providing said local signal at first and second signal frequencies during said first and second portions, respectively, of said plurality of time slots within said present time frame; and controller means for receiving and storing said first and second sets of control data during a prior time frame and for providing to said signal generator stage one of said first and second sets of control data during a first time interval between said first and second portions of said plurality of time slots within said present time frame.

13. The apparatus of claim 12, wherein said receiver means comprises:

frequency conversion means for frequency converting said incoming data signal and in accordance therewith providing said frequency converted incoming data signal; and quadrature mixer means for receiving and converting said frequency converted incoming data signal to a quadrature baseband data signal.

14. The apparatus of claim 12, wherein said transmitter means comprises:

quadrature mixer means for receiving and converting said outgoing data signal to a quadrature data signal; and frequency conversion means for receiving said local signal and in accordance therewith receiving and frequency converting said quadrature data signal and in accordance therewith providing said frequency converted outgoing data signal.

15. The apparatus of claim 12, wherein said signal generator means comprises integer phase lock loop means.

16. The apparatus of claim 15, wherein said controller means comprises:

first data storage means for storing said first set of control data; and second data storage means for storing said second set of control data.

17. The apparatus of claim 15, wherein said first time interval has a duration which is less than one of said plurality of time slots within said present time frame.

18. The apparatus of claim 12, wherein said controller means comprises:

first data storage means for storing said first set of control data; and second data storage means for storing said second set of control data.

19. The apparatus of claim 12, wherein said first time interval has a duration which is less than one of said plurality of time slots within said present time frame.

20. The apparatus of claim 12, wherein:

said receiver means is further for receiving said local signal and in accordance therewith monitoring another incoming signal during a third portion of said plurality of time slots within said present time frame and in accordance therewith providing an indication of a signal strength of said another incoming signal;

said signal generator means is further for receiving a third set of control data and in accordance therewith providing said local signal at a third signal frequency during said third portion of said plurality of time slots within said present time frame; and said controller means is further for receiving and storing said third set of control data during said prior time frame and for providing to said signal generator stage another of said first, second and third sets of control data during a second time interval between said first and third portions of said plurality of time slots within said present time frame.

21. The apparatus of claim 20, wherein said controller means comprises:

first data storage means for storing said first set of control data;

second data storage means for storing said second set of control data; and third data storage means for storing said third set of control data.

22. The apparatus of claim 20, wherein each of said first and second time intervals has a duration which is less than one of said plurality of time slots within said present time frame.

23. A method for time division duplexing operations within a GSM transceiver for receiving a data signal and transmitting a data signal during a single time frame, comprising the steps of:

storing first and second sets of frequency control data during a prior time frame;

reading said first set of frequency control data during a first time interval and in accordance therewith generating a local signal at a first frequency;

receiving and frequency converting an incoming data signal in accordance with said local signal at said first frequency during a first portion of a plurality of time slots within a present time frame and in accordance therewith generating a frequency converted incoming data signal;

reading said second set of frequency control data during a second time interval and in accordance therewith generating said local signal at a second frequency; and receiving and frequency converting an outgoing data signal in accordance with said local signal at said second frequency during a second portion of said plurality of time slots within said present time frame and in accordance therewith generating a frequency converted outgoing data signal;

wherein one of said first and second time intervals is between said first and second portions of said plurality of time slots within said present time frame.

24. The method of claim 23, wherein said step of receiving and frequency converting an incoming data signal in accordance with said local signal at said first frequency during a first portion of a plurality of time slots within a present time frame and in accordance therewith generating a frequency converted incoming data signal comprises:

frequency converting said incoming data signal and in accordance therewith providing said frequency converted incoming data signal; and converting said frequency converted incoming data signal to a quadrature baseband data signal.

25. The method of claim 23, wherein said step of receiving and frequency converting an outgoing data signal in accordance with said local signal at said second frequency during a second portion of said plurality of time slots within said present time frame and in accordance therewith generating a frequency converted outgoing data signal comprises:

converting said outgoing data signal to a quadrature data signal; and receiving said local signal and in accordance therewith receiving and frequency converting said quadrature data signal and in accordance therewith providing said frequency converted outgoing data signal.

26. The method of claim 23, wherein said steps of reading said first, second and third sets of frequency control data during said first, second and third time intervals and in accordance therewith generating said local signal at said first, second and third frequencies, respectively comprise generating said local signal at said first, second and third frequencies with an integer phase lock loop.

27. The method of claim 26, wherein said step of storing first and second sets of frequency control data during a prior time frame comprises storing said first and second sets of frequency control data in first and second data registers.

28. The method of claim 26, wherein said one of said first and second time intervals has a duration which is less than one of said plurality of time slots within said present time frame.

29. The method of claim 23, wherein said step of storing first and second sets of frequency control data during a prior time frame comprises storing said first and second sets of frequency control data in first and second data registers.

30. The method of claim 23, wherein said one of said first and second time intervals has a duration which is less than one of said plurality of time slots within said present time frame.

31. The method of claim 23, further comprising the steps of:

storing a third set of frequency control data during said prior time frame;

reading said third set of frequency control data during a third time interval and in accordance therewith generating said local signal at a third frequency; and monitoring another incoming signal in accordance with said local signal at said third frequency during a third portion of said plurality of time slots within said present time frame;

wherein another of said first, second and third time intervals is between said first and third portions of said plurality of time slots within said present time frame.

32. The method of claim 31, wherein said steps of storing first, second and third sets of frequency control data during a prior time frame comprises storing said first, second and third sets of frequency control data in first, second and third data registers.

33. The method of claim 31, wherein said one and said another of said first, second and third time intervals each has a duration which is less than one of said plurality of time slots within said present time frame.

* * * * *

UNITED STATES PATENT AND TRADEMARK OFFICE
CERTIFICATE OF CORRECTION

PATENT NO. : 6,757,261 B1
DATED : June 29, 2004
INVENTOR(S) : Olgaard et al.

It is certified that error appears in the above-identified patent and that said Letters Patent is hereby corrected as shown below:

<u>Drawings,</u>
Replace the drawing sheet containing Fig. 4A with the attached Fig. 4A drawing sheet.
Replace the drawing sheet containing Fig. 4B with the attached Fig. 4B drawing sheet.

<u>Column 1,</u>
Line 31, please delete "used" and replace with -- use --.
Line 44, please delete "set up" and replace with -- setup --.

<u>Column 3,</u>
Line 17, after the word "station", please delete "as" and replace with -- at --.
Line 38, please delete "236microseconds", and replace with -- 236 microseconds --.
Line 62, please delete "met", and replace with -- meet --.

Signed and Sealed this

Twenty-second Day of March, 2005

JON W. DUDAS
*Director of the United States Patent and Trademark Office*

| | MSB | | | | | | | | | | | | | | | | | | | | | LSB |
|---|---|---|---|---|---|---|---|---|---|---|---|---|---|---|---|---|---|---|---|---|---|---|
| | 23 | 22 | 21 | 20 | 19 | 18 | 17 | 16 | 15 | 14 | 13 | 12 | 11 | 10 | 9 | 8 | 7 | 6 | 5 | 4 | 3:0 |
| 301a Power Control 1 | | | | | | | | | | | | | | | | | Tx | IF syn | RF syn | Rx | 0000 |
| 301b Power Control 2 | | | | | | | | | | | | | | | | | Tx | IF syn | RF syn | Rx | 0001 |
| 301c Power Control 3 | | | | | | | | | | | | | | | | | Tx | IF syn | RF syn | Rx | 0010 |
| 302a Gain Control | | | | | | | | | Out 4 | Out 3 | Out 2 | Out 1 | Auto cal | Coarse VGA gain (6 dB step) | | | Fine VGA gain (1 dB step) | | | IF amp | 0011 |
| 302b Gain Control | | | | | | | | | Out 4 | Out 3 | Out 2 | Out 1 | Auto cal | Coarse VGA gain (6 dB step) | | | Fine VGA gain (1 dB step) | | | IF amp | 0100 |
| 302c Gain Control | | | | | | | | | Out 4 | Out 3 | Out 2 | Out 1 | Auto cal | Coarse VGA gain (6 dB step) | | | Fine VGA gain (1 dB step) | | | IF amp | 0101 |
| 303a N-Counter RF PLL 1 | Lna on | Lna 3 | Lna 2 | Lna 1 | Rx/Tx | GSM mo | | | | | | N-count value | | | | | | | | | 0110 |
| 303b N-Counter RF PLL 2 | Lna on | Lna 3 | Lna 2 | Lna 1 | Rx/Tx | GSM mo | | | | | | N-count value | | | | | | | | | 0111 |
| 303c N-Counter RF PLL 3 | Lna on | Lna 3 | Lna 2 | Lna 1 | Rx/Tx | GSM mo | | | | | | N-count value | | | | | | | | | 1000 |

FIG. 4A

| FIG. 4A |
| FIG. 4B |

FIG. 4

| | | | | | | | | | | | | | | | | |
|---|---|---|---|---|---|---|---|---|---|---|---|---|---|---|---|---|
| 304a | N-Counter IF PLL 1 | | | | | | | | | | IF N-count value | | | | | 1001 |
| 304b | N-Counter IF PLL 2 | | | | | | | | | | IF N-count value | | | | | 1010 |
| 305 | R-Counter PLLs | Out 2 mode | | | Out 1 mode | | | 1-2/ 2-3 | IF ipo | IF PD | Filt adj | IF R-count | RF PD | RF R-count value | Lna bias | 1011 |
| 306 | Wide band PLL | Out 4 mode | | | Out 3 mode | | | | GSM TX | Act. LDO | Activate PLLs | Vcp start | Ipo | R-count value | N-count value | 1100 |
| 307 | Misc. control | IQ swp | RX CM | | Xtal tuning | | | res | | | Activate TX blocks | Activate RX blocks | Act. Vco | Xtal en | Act Xtal Ldo | Activate RX blocks | 1101 |
| | | | | | | | | | | | | | | | | 1110 |
| 308 | Test Mode | DAC select | | | DAC value | | | | pll test | RF mix | tx phase shift | | | | | 1111 |

FIG. 4B

300